US012490157B2

(12) United States Patent
Lin et al.

(10) Patent No.: US 12,490,157 B2
(45) Date of Patent: Dec. 2, 2025

(54) TIMING CHANGE AND NEW RADIO MOBILITY PROCEDURE

(71) Applicant: MEDIATEK INC., Hsin-Chu (TW)

(72) Inventors: Hsuan-Li Lin, Hsin-Chu (TW); Tsang-Wei Yu, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 499 days.

(21) Appl. No.: 17/952,283

(22) Filed: Sep. 25, 2022

(65) Prior Publication Data
US 2023/0124729 A1  Apr. 20, 2023

Related U.S. Application Data

(60) Provisional application No. 63/256,656, filed on Oct. 18, 2021.

(51) Int. Cl.
    *H04W 36/08* (2009.01)
    *H04W 36/00* (2009.01)
    *H04W 56/00* (2009.01)

(52) U.S. Cl.
    CPC ... *H04W 36/0085* (2018.08); *H04W 36/0058* (2018.08); *H04W 36/083* (2023.05); *H04W 56/001* (2013.01)

(58) Field of Classification Search
    CPC ......... H04W 36/0085; H04W 36/0058; H04W 36/083; H04W 56/001
    See application file for complete search history.

(56) References Cited

U.S. PATENT DOCUMENTS

| 11,838,151 | B1* | 12/2023 | Jones | H04L 25/0224 |
| 2020/0383022 | A1* | 12/2020 | Shrestha | H04W 36/0064 |
| 2024/0414601 | A1* | 12/2024 | Back | H04W 36/033 |

FOREIGN PATENT DOCUMENTS

WO   WO 2020092732 A1   1/2018

OTHER PUBLICATIONS

Europe IPO, search report for the European patent application 22201707.1, dated Feb. 17, 2023 (11 pages).
R4-2118326, MediaTek Inc "Discussion on the maximum timing changed during the measurement", 3GPP Draft, Oct. 22, 2021.
(Continued)

*Primary Examiner* — Mohammad S Adhami
*Assistant Examiner* — Andrew Chanul Kim
(74) *Attorney, Agent, or Firm* — Helen Mao; Zheng Jin; Imperium Patent Works

(57) ABSTRACT

A method of determining the maximum timing change (MTC) based on subcarrier spacing (SCS) configuration for UE measurement and reporting of a neighbor cell in 5 GS is proposed. During measurement procedure, UE first checks whether a neighbor cell has been detectable at least for the time period $T_{identity}$, and becomes undetectable for a period ≤5 seconds, and then the cell becomes detectable again. UE then determines the MTC of the cell according to the SCS configuration of the cell. If the timing change of the cell is <MTC, UE reports the measurement report less than a first period (T1) after the measurement event is triggered. Otherwise, if the timing change of the cell is >MTC, UE reports the event triggered measurement reporting less than a second period (T2) after the measurement event is triggered.

20 Claims, 5 Drawing Sheets

(56) References Cited

OTHER PUBLICATIONS

RP-212854, R4-2120426, Apple "Big CR to TS 38.133: NR_newRAT-Core maintenance (Rel-17)", 3GPP draft, Nov. 24, 2021.
R4-2207876, MediaTek Inc "Maintenance CR for RRM requirements on 38.133 R17", May 20, 2022.

* cited by examiner

| SSB SCS | SSB CP length | | ± 3200 Tc | MTC |
|---|---|---|---|---|
| kHz | us | Ts | in CP% | Tc |
| 15 | 4.7 | 142.1 | ± 35% | ± 3200 |
| 30 | 2.3 | 71.1 | ± 70% | ± 1600 |
| 60 | 1.2 | 35.5 | ± 141% | ± 800 |
| 120 | 0.6 | 17.8 | ± 281% | ± 400 |
| 240 | 0.3 | 8.9 | ± 563% | ± 200 |

TIMING CHANGE AND NEW RADIO MOBILITY PROCEDURE

CROSS REFERENCE TO RELATED APPLICATIONS

This application claims priority under 35 U.S.C. § 119 from U.S. Provisional Application No. 63/256,656, entitled "Timing Change and NR mobility procedure", filed on Oct. 18, 2021, the subject matter of which is incorporated herein by reference.

TECHNICAL FIELD

The disclosed embodiments relate generally to wireless communication, and, more particularly, to a method for mobility procedure enhancement in 5G New Radio (NR) cellular communication networks.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems. In 5G NR, the base stations are also referred to as gNodeBs or gNBs.

Frequency bands for 5G NR are being separated into two different frequency ranges. Frequency Range 1 (FR1) includes sub-6 GHz frequency bands, some of which are bands traditionally used by previous standards, but has been extended to cover potential new spectrum offerings from 410 MHz to 7125 MHz. Frequency Range 2 (FR2) includes frequency bands from 24.25 GHz to 52.6 GHz. Bands in FR2 in this millimeter wave range have shorter range but higher available bandwidth than bands in FR1. For UEs in RRC Idle mode mobility, cell selection is the procedure through which a UE picks up a specific cell for initial registration after power on, and cell reselection is the mechanism to change cell after UE is camped on a cell and stays in idle mode. For UEs in RRC Connected mode mobility, handover is the procedure through which a UE hands over an ongoing session from the source gNB to a neighboring target gNB.

In 5G NR, for the procedures such as handover to a stronger neighbor cell, it is required to measure the serving cell and the neighbor cell signal strength or signal quality matrix, i.e., RSRP or RSRQ. This requirement enables the measurement process to be executed appropriately, maintaining the radio link quality. In LTE, all eNodeBs continually transmits Cell-specific Reference Signal (CRS), so it is easy for the mobile device to measure the cell quality of neighboring cells. In 5G NR, the concept of CRS has been removed to reduce the overhead and Reference Signal interference from other cells. 5G NR has introduced cell signal measurement by using SS/PBCH Block (SSB), which is composed of Synchronizations Signal (SS) and Physical Broadcast Channel (PBCH) having longer transmission periodicity than CRS.

The network may configure UE to perform measurements and reporting in accordance with measurement configuration. In 5G NR, the measurement configuration provided by the network contains each measurement object indicating the frequency and time location as well as the subcarrier spacing (SOS) of the reference signals to be measured. The network also configures UE to report measurement results based on SSB and CSI-RS resources. Under R15 requirements, if a cell has been detectable at least for the time period $T_{identity}$ as defined in standard, and becomes undetectable for a period 5 seconds, and then becomes detectable again with the same spatial reception parameter, and triggers an event provided the timing to that cell has not changed more than ±3200 Tc, then the event-triggered measurement reporting delay does not include the synchronization time. Otherwise, the event triggered measurement reporting delay includes the synchronization time.

For higher SOS, the Cyclic Prefix (CP) length is shorter. If the timing change of a cell is larger than CP, then the UE needs to detect the cell timing again. Therefore, the UE needs to consider the SCS configuration in determining the maximum timing change (MIC) for measurement reporting delay.

SUMMARY

A method of determining the maximum timing change (MTC) based on subcarrier spacing (SCS) configuration for UE measurement and reporting of a neighbor cell in 5 GS is proposed. During measurement procedure, UE first checks whether a neighbor cell has been detectable at least for the time period $T_{identity}$, and becomes undetectable for a period 5 seconds, and then the cell becomes detectable again. UE determines the MTC of the cell according to the SCS configuration of the cell. UE then compares the timing change of the cell with the determined MTC. If the timing change of the cell is <MTC, UE reports the measurement report less than a first period (T1) after the measurement event is triggered. Otherwise, if the timing change of the cell is >MTC, UE reports the event triggered measurement reporting less than a second period (T2) after the measurement event is triggered.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
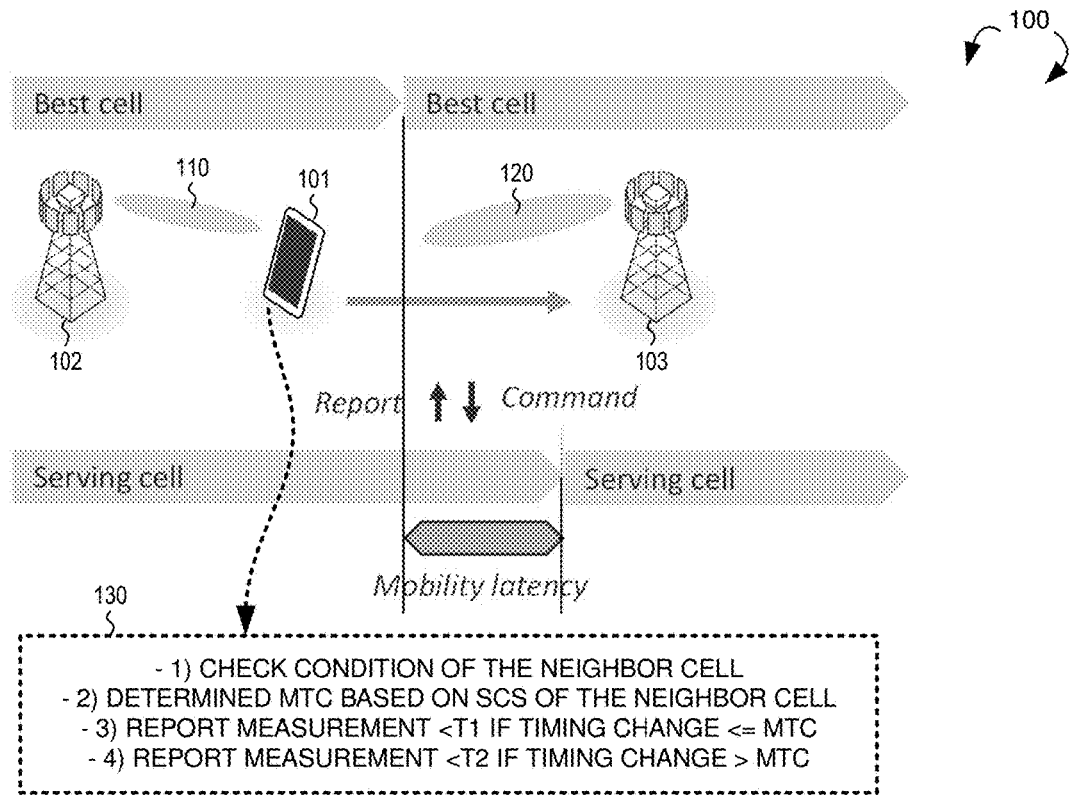
FIG. 1 illustrates an exemplary 5G New Radio (NR) network supporting user equipment (UE) mobility measurement procedure with maximum timing change (MTC) determined based on subcarrier spacing (SCS) configuration in accordance with aspects of the current invention.

FIG. 1 illustrates an exemplary 5G New Radio (NR) network 100 supporting user equipment (UE) mobility measurement procedure with maximum timing change (MTC) determined based on subcarrier spacing (SCS) configuration in accordance with aspects of the current invention. The 5G NR network 100 comprises a User Equipment (UE) 101 and a plurality of base stations including gNB 102 and gNB 103. UE 101 is communicatively connected to a serving gNB 102, which provides radio access using a Radio Access Technology (RAT) (e.g., the 5G NR technology). The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The 5G core function receives all connection and session related information and is responsible for connection and mobility management tasks. For UEs in radio resource control (RRC) Idle mode mobility, cell selection is the procedure through which a UE picks up a specific cell for initial registration after power on, and cell reselection is the mechanism to change cell after UE is camped on a cell and stays in idle mode. For UEs in RRC Connected mode mobility, handover is the procedure through which a UE hands over an ongoing session from the source gNB to a neighboring target gNB. In FIG. 1, gNB 102 is considered as the best cell, which provides communication coverage for a geographic coverage area in which communications with UE 101 is supported via a communication link/beam 110. Later on, gNB 103 may become the best cell, which provide communication coverage for a geographic coverage area in which communications with UE 101 is supported via a communication link/beam 120. For the handover to occur, UE 101 is required to measure the serving cell 110 and neighbor cell 120 signal strength or signal quality matrix, i.e., RSRP (reference signal received power) or RSRQ (reference signal received quality) based on measurement configuration.

The network may configure UE to perform measurements and reporting in accordance with measurement configuration. In 5G NR, the measurement configuration provided by the network contains each measurement object, which may indicate the frequency and time location as well as the subcarrier spacing (SCS) of the reference signals to be measured. In one embodiment, the SCS can also be determined according to the frequency bands to be measured (e.g., certain SCS is applicable for particular bands). In one embodiment, time location is provided by SSB Measurement Timing Configuration (SMTC) or SSB configuration indicating the SSB positions or the SSB to be measured. 5G NR has introduced cell signal measurement by using SS/PBCH Block (SSB), which is composed of Synchronizations Signal (SS) and Physical Broadcast Channel (PBCH) having longer transmission periodicity than Cell-specific Reference Signal (CRS). The network may also configure UE to report measurement results based on SSB and CSI-RS resources. During measurement procedure, UE is triggered by an event to perform measurement and reporting of a neighbor cell. The event-triggered measurement reporting has a delay, which is defined as the time duration between an event that will trigger a measurement report, and the point when the UE starts to transmit the measurement report to the network over the air interface.

In general, if the timing change of the being-measured neighbor cell is big, then UE needs to perform cell search before SSB measurement, then the measurement reporting delay can be represented by $T_{identity}$, which may include the time for 1) cell search ($T_{PSS/SSS\_sync}$), 2) SSB measurement ($T_{SSB-measurement-period}$), and 3) SSB index decoding ($T_{SSB\_time\_index}$) if SBI reading is needed. On the other hand, if the timing change of the neighbor cell is small, then UE does not need to perform cell search before SSB measurement, then the measurement reporting delay can be represented by $T_{SSB\_measurement\_period}$. The maximum timing change (MTC) of a cell is a parameter that can be used to determine the requirement for the event-triggered measurement reporting delay.

Under the current 3GPP R15 requirements, if a cell has been detectable at least for the time period $T_{identity}$, becomes undetectable for a period 5 seconds, and then the cell becomes detectable again with the same spatial reception parameter and triggers an event provided the timing to that cell has not changed more than ±3200 Tc (the maximum timing change—MTC), then the event triggered measurement reporting delay does not include cell search/synchronization time and should be less than $T_{SSB\_measurement\_period}$. Otherwise, the event triggered measurement reporting delay includes the cell search/synchronization time and should be less than $T_{identity}$. For higher subcarrier spacing (SCS), however, Cyclic Prefix (CP) length is shorter. If the timing change is larger than CP length, then the UE needs to detect the cell timing by performing cell search and synchronization before performing SSB measurements. As a result, the fixed MTC=±3200 Tc value may be too large.

In accordance with one novel aspect, a method of determining the maximum timing change (MTC) based on SCS configuration for UE measurement and reporting in 5 GS is proposed. During measurement procedure 130, UE 101 first checks whether a neighbor cell has been detectable at least for the time period $T_{identity}$, and becomes undetectable for a period 5 seconds and then the cell becomes detectable again and triggers an event for measurement reporting. UE 101 determines the maximum timing change (MTC) of the cell, according to the SCS configuration of the cell. UE 101 then compares the timing change of the cell with the determined MTC. If the timing change of the cell <=MTC, UE 101 reports the event-triggered measurement report less than $T_{SSB\_measurement\_period}$ (the $1^{st}$ period, T1) after the measurement is triggered. Otherwise, if the timing change of the cell>MTC, UE 101 reports the event-triggered measurement report less than $T_{identity}$ (the $2^{nd}$ period, T2), after the measurement event is triggered. Note that there are two types of intra-frequency $T_{identity}$, with or without SSB index (SBI) reading:

$$T_{identity\_intra\_without\_index} = (T_{PSS/SSS\_sync\_intra} + T_{SSB\_measurement\_period\_intra}) \text{ms}$$

$$T_{identity\_intra\_with\_index} = (T_{PSS/SSS\_sync\_intra} + T_{SSB\_measurement\_period\_intra} + T_{SSB\_time\_index\_intra}) \text{ms}$$

Figure 2:
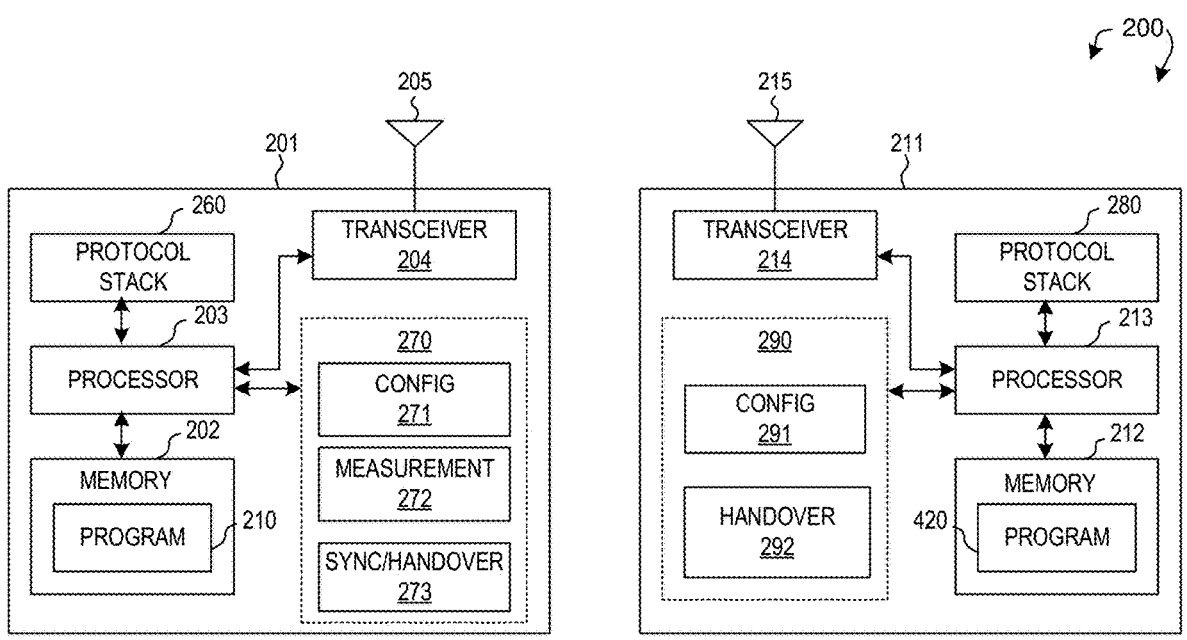
FIG. 2 illustrates simplified block diagrams of wireless devices, e.g., a UE and a gNB in accordance with embodiments of the current invention.

FIG. 2 illustrates simplified block diagrams of wireless devices, e.g., a UE 201 and a gNB 211 in accordance with embodiments of the current invention in 5G NR network 200. The gNB 211 has an antenna 215, which transmits and receives radio signals. An RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a configuration circuit 291 for configuring measurement report and active set for UE, and a handover handling circuit 292 for sending cell-switch to the UE upon handover decision.

Similarly, the UE 201 has a memory 202, a processor 203, and an RF transceiver module 204. The RF transceiver 204 is coupled with the antenna 405, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals (e.g., comprising an SCell/PSCell addition/activation command) and invokes different functional modules and circuits to perform features in the UE 201. The memory 202 stores data and program instructions 210 to be executed by the processor 203 to control the operations of the UE 201. Suitable processors include, by way of example, a special purpose processor, a Digital Signal Processor (DSP), a plurality of micro-processors, one or more microprocessor associated with a DSP core, a controller, a microcontroller, Application Specific Integrated Circuits (ASICs), File Programmable Gate Array (FPGA) circuits, and other type of Integrated Circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network. In one example, the control function modules and circuits 270 include a configuration circuit 271 for obtaining measurement and reporting configuration information, a measurement circuit 272 for performing measurements and reporting measurement results, and a sync/handover handling circuit 273 for performing cell search, synchronization, and handover procedure based on the configuration received from the network.

Figures 3, 4:
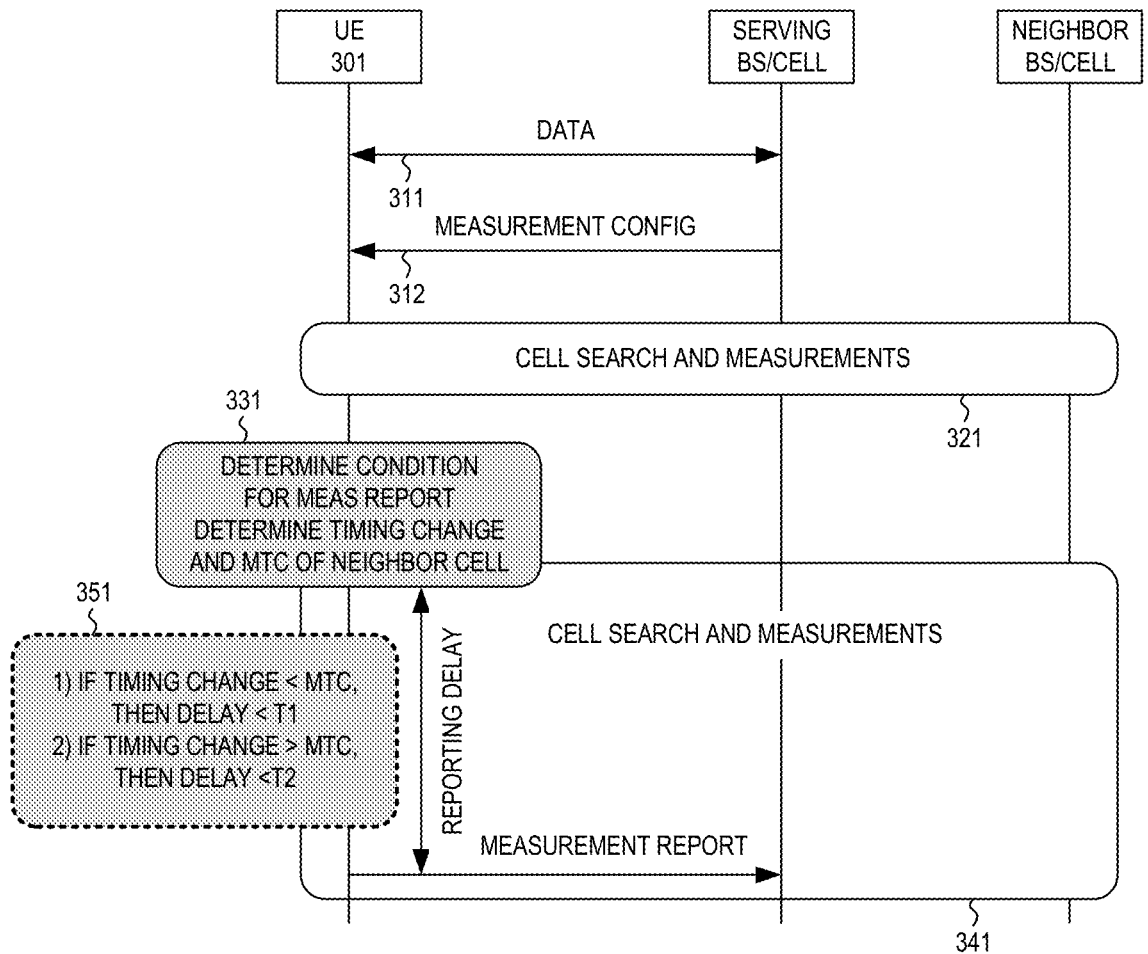
FIG. 3 is a message sequence flow between a UE, a serving cell, and a neighbor cell for UE measurements and reporting in accordance with one novel aspect.
FIG. 4 illustrates the relationship between SSB subcarrier spacing (SCS), SSB cyclic prefix (CP) length, the value of 3200 Tc, and MTC.

FIG. 3 is a message sequence flow between a UE, a serving cell, and a neighbor cell for UE measurements and reporting in accordance with one novel aspect. In step 311, UE 301 transmits and receives data with a source base station in a source cell. In step 312, UE 301 receives serving cell and neighbor cell measurement and reporting configuration from the serving gNB. The measurement configuration comprises information for UE 301 to perform cell search/cell detection and measurements on the serving cell and neighboring cells (step 321). Certain neighbor cells are detectable and certain neighbor cells are non-detectable. A cell is detectable only if at least one SSBs measured from the cell being configured remains detectable during the time period $T_{identity\ intra\ without\ index}$ or $T_{identity\ intra\ with\ index}$ defined in the 3GPP standard.

In step 331, UE 301 determines whether a neighbor cell has met certain conditions for event-triggered measurement reporting. UE 301 also determines the timing change of the cell and the maximum timing change (MTC) of the cell. In one example, if a cell has been detectable at least for the time period $T_{identity\ intra\ without\ index}$ or $T_{identity\ intra\ with\ index}$, and then the cell becomes undetectable for a period ≤5 seconds, and then the cell becomes detectable again with the same spatial reception parameter, the conditions are satisfied for triggering an event for measurement report.

In step 341, UE 301 performs cell search (if needed) and SSB measurements, and report measurement results to the serving gNB. The event-triggered measurement reporting has a delay, and such delay should be less a predefined time period. In normal case, the event-triggered measurement reporting delay of the cell, measured without L3 filtering, should be less than $T_{identity\ intra\ without\ index}$ or $T_{identity\ intra\ with\ index}$. However, if the cell satisfies the above-illustrated condition, then the event triggered measurement reporting delay should be less than $T_{SSB\_measurement\_period\_intra}$ (e.g., a first period T1), provided the timing to that cell has not changed more than a maximum timing change (MTC) of the cell, while the measurement gap has not been available and L3 filtering has not been used. Otherwise, the even-triggered measurement reporting delay of the cell should be less than $T_{identity\ intra\ without\ index}$ or $T_{identity\ intra\ with\ index}$ (e.g., a second period T2), provided the timing to that cell has changed more than the MTC of the cell (351). In accordance with one novel aspect, the MTC of the cell is determined based on the SCS configuration of the cell. In one preferred embodiment, MTC=±(3200/2^μ)Tc, where μ is the SCS configuration of the cell.

FIG. 4 illustrates the relationship between SSB subcarrier spacing (SCS), SSB cyclic prefix (CP) length, the value of 3200 Tc, and MTC. 5G NR supports different numerologies (e.g., cyclic prefix and subcarrier spacing). Table 410 shows different SCS and SSB CP, ranging from 15 kHz to 240 kHZ. During neighbor cell measurement procedure, if the timing change of a cell is shorter than the CP length (i.e., the MTC), then UE does not need to detect the cell timing before performing SSB measurements; otherwise, the UE needs to detect the cell timing again. The maximum timing change can be defined to be less than the CP length to guarantee that the UE does not need to do cell search and synchronization before performing SSB measurement. It can be seen that for higher SCS, the corresponding CP length is shorter. Therefore, when determining the MTC of a cell, instead of defining MTC=±3200 Tc to be a fixed value, the UE needs to consider the SCS configuration of the cell.

In the example of FIG. 4, in one preferred embodiment, MTC of a neighbor cell is determined based on its corresponding SCS configuration: MTC=±(3200/2$^\mu$)Tc, wherein Tc is a sampling rate, and $\mu$ corresponds to the SCS configuration, wherein $\mu$=0 for SCS=15 kHz; $\mu$=1 for SCS=30 kHz; $\mu$=2 for SCS=60 kHz; $\mu$=3 for SCS=120 kHz; and $\mu$=4 for SCS=240 kHz. As a result, for SCS=15 kHz, MTC=±3200/2$^\mu$ Tc=±3200 Tc; for SCS=30 kHz, MTC=±3200/2$^\mu$ Tc=±1600 Tc; for SCS=60 kHz, MTC=±3200/2$^\mu$ Tc=±800 Tc; for SCS=120 kHz, MTC=±3200/2$^\mu$ Tc=±400 Tc; for SCS=240 kHz, MTC=±3200/2$^\mu$ Tc=±200 Tc. Note that Tc is the sampling time at a sampling rate of 480*4.096 MHz, where Tc=1/(480*1000*4096)=0.509 ns. Tc is the basic time unit defined in the 3GPP standard specification.

Figure 5:
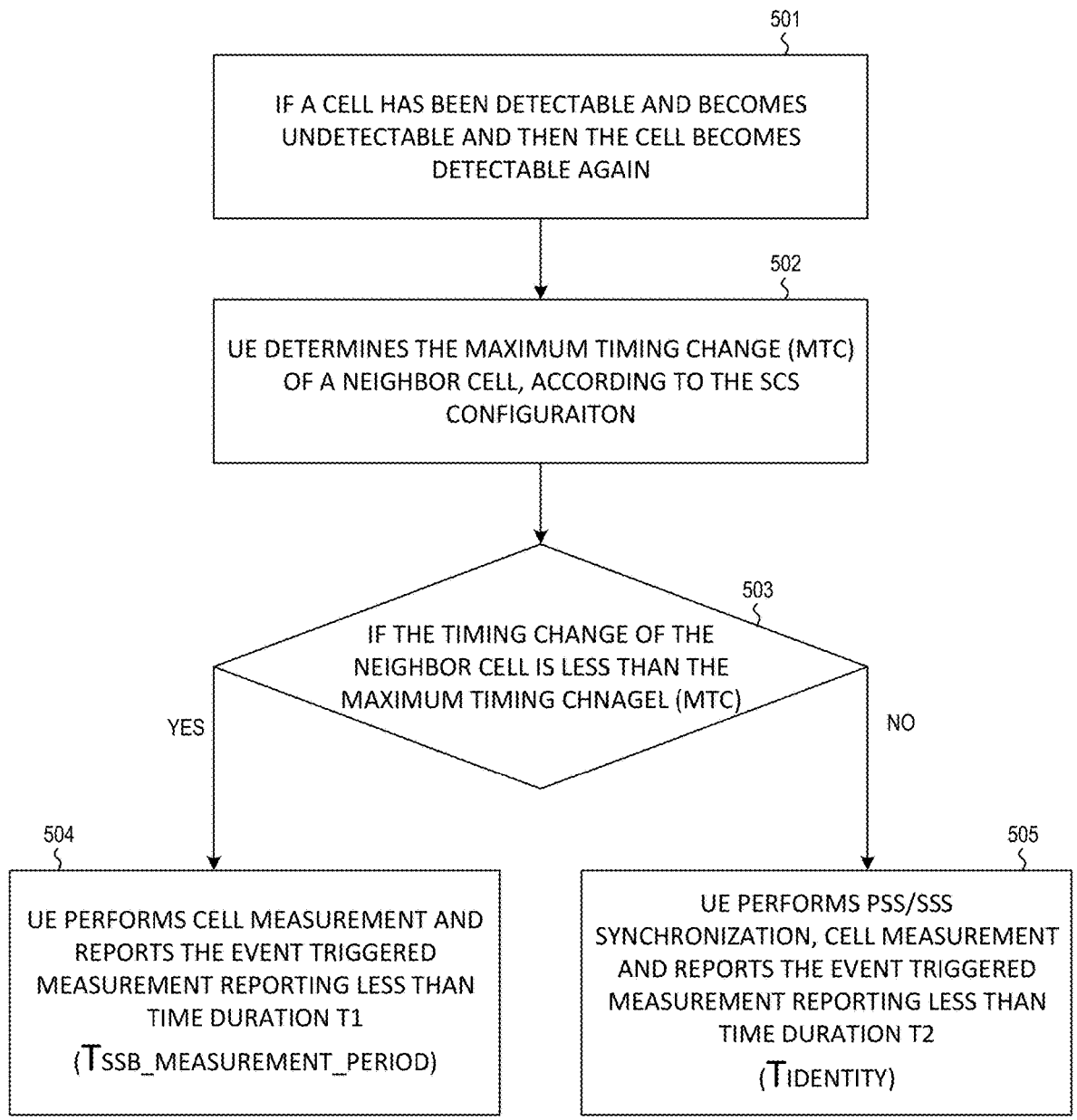
FIG. 5 illustrates one embodiment of performing measurement and reporting with MTC determined based on SCS configuration in one novel aspect.

FIG. 5 illustrates one embodiment of performing measurement and reporting with MTC determined based on SCS configuration in one novel aspect. A UE is configured to perform measurement and reporting for neighbor cells. In step 501, the UE checks if a neighbor cell has been detectable at least for the time period $T_{identity\ intra\ without\ index}$ or $T_{identity\ intra\ with\ index}$ defined in standard, and becomes undetectable for a period ≤5 seconds, and then the cell becomes detectable again with the same spatial reception parameter and triggers an event for UE to report measurement results to the network. In step 502, the UE determines the maximum timing change (MTC) for the neighbor cell, according to the SCS configuration of the neighbor cell, e.g., MTC=±(3200/2$^\mu$)Tc. In step 503, the UE compares the timing change of the neighbor cell with the determined MTC value and check if the timing change of the neighbor cell is less than the MTC. Note that cell timing is the DL frame timing that can be known from the received SSBs of the cell. The UE can derive the timing change of the neighbor cell based on the receiving timing of SSB occasions of the neighbor cell.

If the answer to step 503 is yes, then the UE goes to step 504. The UE performs cell measurement and reports the event-triggered measurement reporting less than a first time duration T1=$T_{SSB\_MEASUREMENT\_PERIOD}$, after the measurement event is triggered, where $T_{SSB\_MEASUREMENT\_PERIOD}$ is the time for SSB measurement period, i.e., the measurement reporting delay is less than T1. In another word, the UE does not need to perform cell search and synchronization with the neighbor cell, because the timing change of the neighbor cell is less than MTC (e.g., less than the CP length of the cell). Note that this applies for a cell which has been detectable and becomes undetectable and then the cell becomes detectable again (step 501).

If the answer to step 503 is no, then the UE goes to step 505. The UE performs PSS/SSS cell search and synchronization with the neighbor cell, cell measurement and reports the event-triggered measurement reporting less than a second time duration T2=$T_{IDENTITY}$, after the measurement event is triggered, where $T_{IDENTITY}$ is the time duration of cell identification, which includes T1 ($T_{SSB\_MEASUREMENT\_PERIOD}$) plus the time for PSS/SSS synchronization ($T_{PSS/SSS\_sync}$), in order for UE to detect the cell timing, i.e., the measurement reporting delay is less than T2. In another word, the UE needs to perform cell search and synchronization with the neighbor cell before the cell measurement, because the timing change of the neighbor cell is larger than MTC (e.g., larger than the CP length of the cell). Note that the event-triggered measurement reporting delay is defined as the time between an event that will trigger a measurement report and the time when the UE starts to transmit the measurement report to the network over the air interface.

Figure 6:
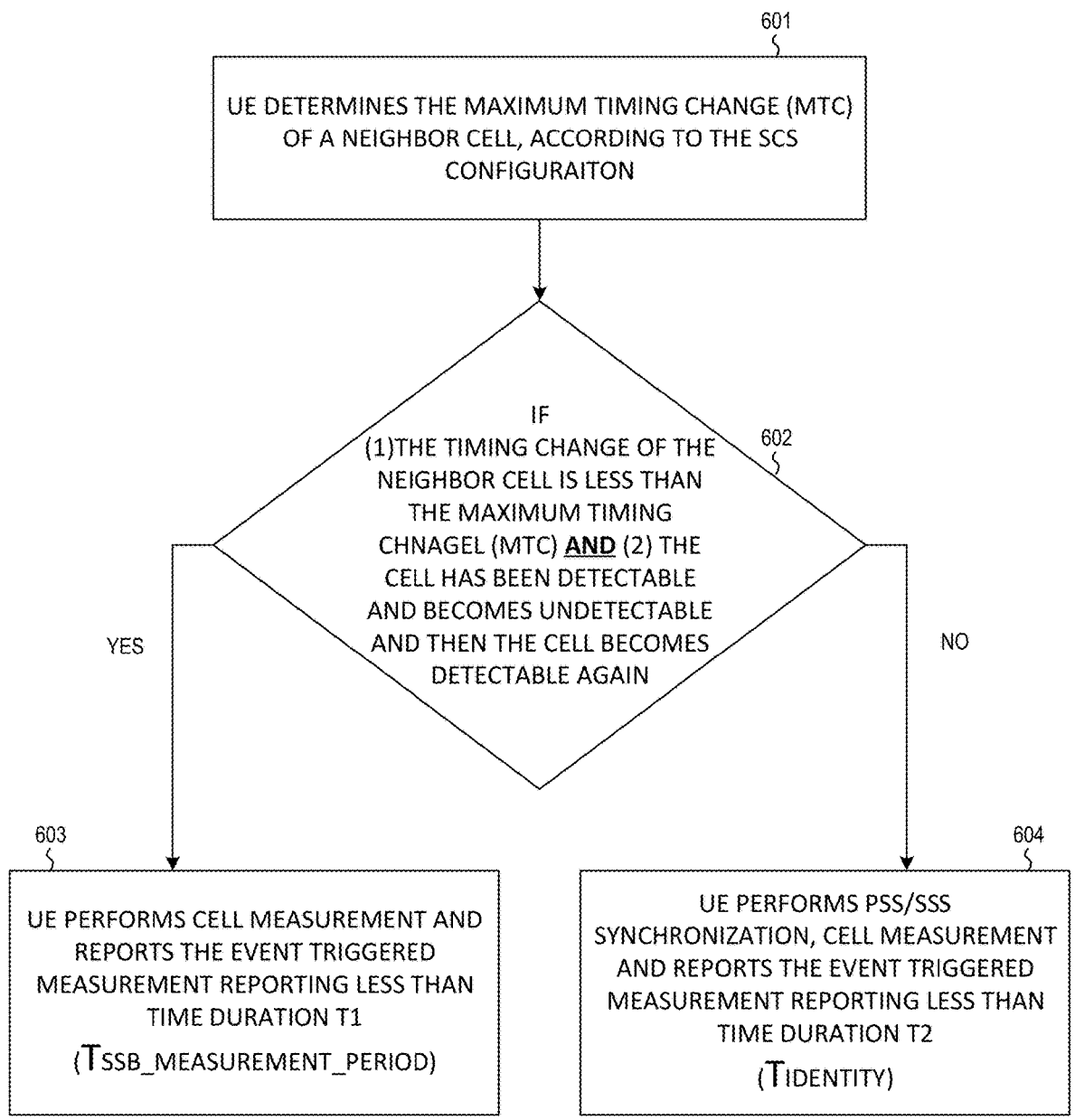
FIG. 6 illustrates another embodiment of performing measurement and reporting with MTC determined based on SCS configuration in one novel aspect.

FIG. 6 illustrates another embodiment of performing measurement and reporting with MTC determined based on SCS configuration in one novel aspect. A UE is configured to perform measurement and reporting for neighbor cells. In step 601, the UE determines the maximum timing change (MTC) for a neighbor cell, according to the SCS configuration of the neighbor cell, e.g., MTC=±(3200/2$^\mu$)Tc. In step 602, the UE compares the timing change of the neighbor cell with the determined MTC value and check if the timing change of the neighbor cell is less than the MTC (1). The UE also checks whether the cell has been detectable at least for the time period $T_{identity\ intra\ without\ index}$ or $T_{identity\ intra\ with\ index}$ defined in standard, and becomes undetectable for a period ≤5 seconds, and then the cell becomes detectable again with the same spatial reception parameter and triggers an event for UE to report measurement results to the network (2).

If the answer is yes to both questions in step 602, then the UE goes to step 603. The UE performs cell measurement and reports the event-triggered measurement reporting less than a first time duration T1=$T_{SSB\_MEASUREMENT\_PERIOD}$, after the measurement event is triggered, where $T_{SSB\_MEASUREMENT\_PERIOD}$ is the time for SSB measurement period, i.e., the measurement reporting delay is less than T1. In another word, the UE does not need to perform cell search and synchronization with the neighbor cell, because the timing change of the neighbor cell is less than MTC (e.g., less than the CP length of the cell). If the answer to at least one of the questions in step 602 is no, then the UE goes to step 604. The UE performs PSS/SSS cell search and synchronization with the neighbor cell, cell measurement and reports the event-triggered measurement reporting less than a second time duration T2=$T_{IDENTITY}$, after the measurement event is triggered, where $T_{IDENTITY}$ is the time duration of cell identification, which includes T1 ($T_{SSB\_MEASUREMENT\_PERIOD}$) plus the time for PSS/SSS synchronization ($T_{PSS/SSS\_sync}$), in order for UE to detect the cell timing, i.e., the measurement reporting delay is less than T2. In another word, the UE needs to perform cell search and synchronization with the neighbor cell before the cell measurement, because the timing change of the neighbor cell is larger than MTC (e.g., larger than the CP length of the cell).

For neighbor cell measurements in intra-frequency, T1=($T_{SSB\_MEASUREMENT\_PERIOD}$) is $T_{SSB\_MEASUREMENT\_PERIOD\_INTRA}$. If SSB index (SBI) reading and reporting is needed, then T2=$T_{IDENTITY}$ is $T_{IDENTITY\_INTRA\_WITH\_INDEX}$. If SBI reading and reporting is not needed, then T2=$T_{IDENTITY}$ is $T_{IDENTITY\_INTRA\_WITHOUT\_INDEX}$. For neighbor cell measurements in inter-frequency, T1=($T_{SSB\_MEASUREMENT\_PERIOD}$) is $T_{SSB\_MEASUREMENT\_PERIOD\_INTER}$. If SSB index (SBI) reading and reporting is needed, then T2=$T_{IDENTITY}$ is $T_{IDENTITY\_INTER\_WITH\_INDEX}$. If SBI reading and reporting is not needed, then T2=$T_{IDENTITY}$ is $T_{IDENTITY\_INTER\_WITHOUT\_INDEX}$.

Figure 7:
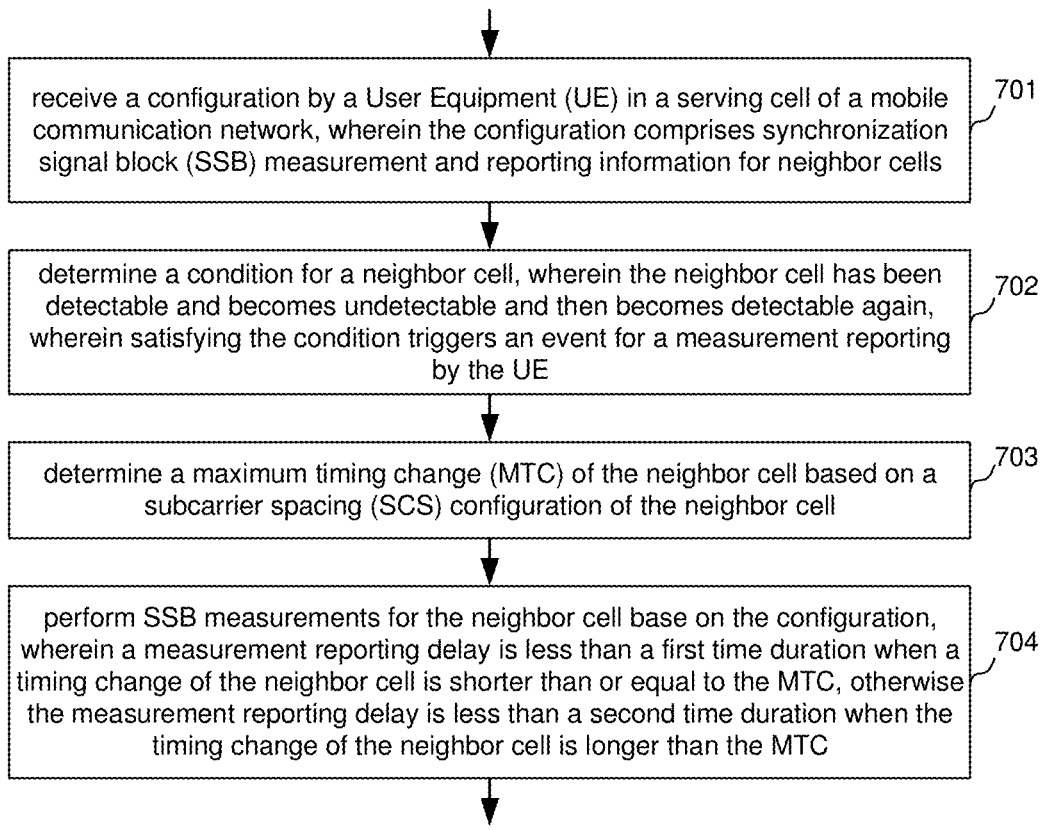
FIG. 7 illustrates a flow chart of a method of determining MTC based on SCS configuration for UE measurement and reporting in accordance with one novel aspect of the current invention.

FIG. 7 illustrates a flow chart of a method of determining MTC based on SCS configuration for UE measurement and reporting in accordance with one novel aspect of the current invention. In step 701, a UE receives a configuration in a serving cell of a mobile communication network, wherein the configuration comprises synchronization signal block (SSB) measurement and reporting information for neighbor cells. In step 702, the UE determines a condition for a neighbor cell, wherein the neighbor cell has been detectable and becomes undetectable and then becomes detectable again, wherein satisfying the condition triggers an event for a measurement reporting by the UE. In step 703, the UE determines a maximum timing change (MTC) of the neighbor cell based on a subcarrier spacing (SCS) configuration of the neighbor cell. In step 704, the UE performs SSB measurements for the neighbor cell base on the configuration, wherein a measurement reporting delay is less than a first time duration when a timing change of the neighbor cell is shorter than or equal to the MTC, otherwise the measurement reporting delay is less than a second time duration when the timing change of the neighbor cell is longer than the MTC.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    receiving a configuration by a User Equipment (UE) in a serving cell of a mobile communication network, wherein the configuration comprises synchronization signal block (SSB) measurement and reporting information for neighbor cells;
    determining a condition for a neighbor cell, wherein the neighbor cell has been detectable and becomes undetectable and then becomes detectable again, wherein satisfying the condition triggers an event for a measurement reporting by the UE;
    determining a maximum timing change (MTC) of the neighbor cell based on a subcarrier spacing (SCS) configuration of the neighbor cell; and
    performing SSB measurements for the neighbor cell based on the configuration, wherein a measurement reporting delay is less than a first time duration when a timing change of the neighbor cell is shorter than or equal to the MTC, otherwise the measurement reporting delay is less than a second time duration when the timing change of the neighbor cell is longer than the MTC.

2. The method of claim 1, wherein the UE derives the timing change of the neighbor cell from received SSBs of the neighbor cell.

3. The method of claim 1, wherein the MTC of the neighbor cell is less than a cyclic prefix (CP) length of the neighbor cell.

4. The method of claim 3, wherein the MTC of the neighbor cell is equal to 3200/24 Tc, wherein Tc is a sampling rate, and u corresponds to the SCS configuration.

5. The method of claim 4, wherein $\mu=0$ for SCS=15 kHz, $\mu=1$ for SCS=30 kHz, $\mu=2$ for SCS=60 kHz, $\mu=3$ for SCS=120 kHz, and $\mu=4$ for SCS=240 KHz.

6. The method of claim 1, wherein a cell is detectable only if the cell remains detectable during a time for identity that includes an SSB measurement period plus a synchronization time.

7. The method of claim 1, wherein the measurement reporting delay is from when the measurement reporting is triggered to when the measurement reporting is being transmitted by the UE.

8. The method of claim 1, wherein the first time duration includes a time for SSB measurement.

9. The method of claim 1, wherein the second time duration is equal to a time for identity that includes an SSB measurement period plus a synchronization time.

10. The method of claim 1, wherein the first time duration and the second time duration further include a time for SSB index decoding.

11. A User Equipment (UE), comprising:
    a receiver that receives a configuration in a serving cell of a mobile communication network, wherein the configuration comprises synchronization signal block (SSB) measurement and reporting information for neighbor cells;
    a control circuit that determines a condition for a neighbor cell, wherein the neighbor cell has been detectable and becomes undetectable and then becomes detectable again, wherein satisfying the condition triggers an event for a measurement reporting by the UE, wherein the UE also determines a maximum timing change (MTC) of the neighbor cell based on a subcarrier spacing (SCS) configuration of the neighbor cell;
    a measurement circuit that performs SSB measurements for the neighbor cell base on the configuration; and
    a transmitter that transmits a measurement report with a measurement reporting delay that is less than a first time duration when a timing change of the neighbor cell is shorter than or equal to the MTC, otherwise the measurement reporting delay is less than a second time duration when the timing change of the neighbor cell is longer than the MTC.

12. The UE of claim 11, wherein the UE derives the timing change of the neighbor cell from received SSBs of the neighbor cell.

13. The UE of claim 11, wherein the MTC of the neighbor cell is less than a cyclic prefix (CP) length of the neighbor cell.

14. The UE of claim 13, wherein the MTC of the neighbor cell is equal to $3200/2^{\mu}$Tc, wherein Tc is a sampling rate, and $\mu$ corresponds to the SCS configuration.

15. The UE of claim 14, wherein $\mu=0$ for SCS=15 kHz, $\mu=1$ for SCS=30 kHz, $\mu=2$ for SCS=60 kHz, $\mu=3$ for SCS=120 kHz, and $\mu=4$ for SCS=240 KHz.

16. The UE of claim 11, wherein a cell is detectable only if the cell remains detectable during a time for identity that includes an SSB measurement period plus a synchronization time.

17. The UE of claim 11, wherein the measurement reporting delay is from when the measurement reporting is triggered to when the measurement reporting is being transmitted by the UE.

18. The UE of claim 11, wherein the first time duration includes a time for SSB measurement.

19. The UE of claim 11, wherein the second time duration is equal to a time for identity that includes an SSB measurement period plus a synchronization time.

20. The UE of claim 11, wherein the first time duration and the second time duration further include a time for SSB index decoding.

* * * * *